(12) United States Patent
Hamada et al.

(10) Patent No.: US 7,496,933 B2
(45) Date of Patent: Feb. 24, 2009

(54) RECORDING MEDIUM DRIVE DEVICE

(75) Inventors: Takeshi Hamada, Tokorozawa (JP); Katsuhiko Tanimoto, Tokorozawa (JP); Yoshimitsu Fukushima, Tokorozawa (JP); Yuji Morita, Tokorozawa (JP); Hitoshi Nagata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/589,472

(22) PCT Filed: Feb. 10, 2005

(86) PCT No.: PCT/JP2005/002008

§ 371 (c)(1),
(2), (4) Date: May 31, 2007

(87) PCT Pub. No.: WO2005/078718

PCT Pub. Date: Aug. 25, 2005

(65) Prior Publication Data

US 2007/0280089 A1 Dec. 6, 2007

(30) Foreign Application Priority Data

Feb. 18, 2004 (JP) ............................. 2004-041782

(51) Int. Cl.
G11B 17/03 (2006.01)

(52) U.S. Cl. ...................................... 720/631

(58) Field of Classification Search ................. 720/606, 720/645, 731, 739, 631; 369/13.21, 75.2
See application file for complete search history.

(56) References Cited

U.S. PATENT DOCUMENTS

| 4,791,511 | A | * | 12/1988 | Davis | 720/739 |
| 5,224,079 | A | * | 6/1993 | Inoue | 369/13.21 |
| 6,243,355 | B1 | * | 6/2001 | Ikebe et al. | 720/731 |
| 2002/0186640 | A1 | * | 12/2002 | Shimizu et al. | 369/75.2 |
| 2005/0044557 | A1 | * | 2/2005 | Lee et al. | 720/606 |

FOREIGN PATENT DOCUMENTS

| JP | 2-140665 | | 11/1990 |
| JP | 5-128692 | | 5/1993 |
| JP | 5-234223 | | 9/1993 |
| JP | 06068589 A | * | 3/1994 |
| JP | 7-153155 | | 6/1995 |
| JP | 8-249798 | | 9/1996 |
| JP | 09190672 A | * | 7/1997 |
| JP | 2002-175678 | | 6/2002 |
| JP | 2003-109343 | | 4/2003 |
| JP | 2003-162860 | | 6/2003 |

* cited by examiner

Primary Examiner—Tianjie Chen
(74) Attorney, Agent, or Firm—Kratz, Quintos & Hanson, LLP

(57) ABSTRACT

A stopper 60 is provided which detects a projected part formed on an upper cartridge case of a shield type cartridge so as to prevent the shield type cartridge from being inserted. Accordingly, mechanical lock caused by the insertion of the shield type cartridge can be prevented.

11 Claims, 9 Drawing Sheets

RECORDING MEDIUM DRIVE DEVICE

TECHNICAL FIELD

The present invention relates to a recording medium drive device.

BACKGROUND ART

As a cartridge type recording medium, the Blue-ray Disc storing an optical disc having a large capacity recording area has been developing in recent years. The shape of the Blue-ray Disc can mainly be divided into two types by the shape of the cartridge. One is a shield type cartridge (refer to, for example, Patent Document 1), and the other is an open type cartridge (refer to, for example, Patent Document 2).

Herein, the shield type cartridge includes a cartridge body, an optical disc rotatably provided inside the cartridge body, an openable and closable shutter which serves as a window for reading or writing the optical disc, and a chucking plate and a plate holder which hold, collaborating with a disc table of the recording medium drive device, the optical disc when the cartridge is housed inside the recording medium drive device. Further, a projected part is projected from the upper surface of the cartridge body in the position where the chucking plate and the plate holder are incorporated.

On the other hand, the open type cartridge includes a cartridge body, an optical disc rotatably provided inside the cartridge body, an openable and closable shutter which serves as a window for reading or writing the optical disc. The open type cartridge does not include a chucking plate and a plate holder, which are included in the shield type cartridge. Accordingly, the recording medium drive device is provided with a clamp mechanism for rotatably holding the optical disc. Further, since a space for setting the chucking plate and the plate holder is unnecessary, the open type cartridge is thinner than the shield type cartridge, which has a projected part formed on the upper surface of the cartridge body, so that there is a difference in shape between the shield type cartridge and the open type cartridge.

[Patent Document 1] Japanese Patent Laid-Open Publication No. 2003-109343 (FIG. 1 and FIG. 2).

[Patent Document 2] Japanese Patent Laid-Open Publication No. 2003-162860 (FIG. 1).

DISCLOSURE OF THE INVENTION

Problems to be Solved by the Invention

To house cartridges having different shapes as described in Patent Document 1 and Patent Document 2 into a recording medium drive device, a space for housing the cartridges in compliance with the respective shapes of the cartridges is necessary. For example, the thickness of the shield type cartridge is larger than that of the open type cartridge by a difference equal to the thickness of the chucking plate and the plate holder. The clamp mechanism for rotatably holding the optical disc inside the device is unnecessary for a recording medium drive device which only houses the shield type cartridge, but the clamp mechanism for rotatably holding the optical disc inside the device is necessary for a recording medium drive device capable of housing not only the shield type cartridge but also other cartridges such as the open type cartridge. In the recording medium drive device capable of housing various kinds of cartridges, not only the clamp mechanism is necessary, but also the thickness has to be set large in order to house the shield type cartridge, so that the device as a whole becomes thick. Particularly, in the case of a recording medium drive device for being incorporated into a personal computer, since a predetermined standard dimension is preset, if the recording medium drive device is thick, the recording medium drive device can not be housed in the space of the predetermined standard dimension.

Of the cartridge type recording media as described above, the open type cartridge has come to be employed as mainstream in recent years. On the other hand, the shield type cartridge tends to be less used due to its large thickness and high unit price. Accordingly, it is presumed that the chance for designing and producing a recording medium drive device capable of housing the shield type cartridge will be reduced in the future. However, when the shield type cartridge is inserted by mistake into a recording medium drive device which does not support the shield type cartridge, since the shield type cartridge has lager thickness than that of other cartridges, there is possibility that the shield type cartridge might be stuck inside the recording medium drive device (mechanical lock), which may cause a trouble. Accordingly, it is desirable to provide a recording medium drive device which detects the difference in shape of the cartridge and prevents the insertion of a cartridge having a predetermined shape based on the detected difference in shape.

An object of the present invention is, in view of the foregoing disadvantages, to provide a recording medium drive device which can prevent erroneous insertion of different kind of recording medium.

Means for Solving the Problems

A recording medium drive device according to an aspect of the present invention allows, among a plurality of kinds of recording media having different shapes, only a part of the recording media to be inserted therein, the recording medium drive device including: a stopper that detects the difference in shape between the part of the recording media and the other recording media so as to prevent the other recording media from being inserted, the stopper detecting a projection formed on an outer surface of a cartridge in which one of the other recording media is contained.

EXPLANATION OF CODES

Figure 1A:
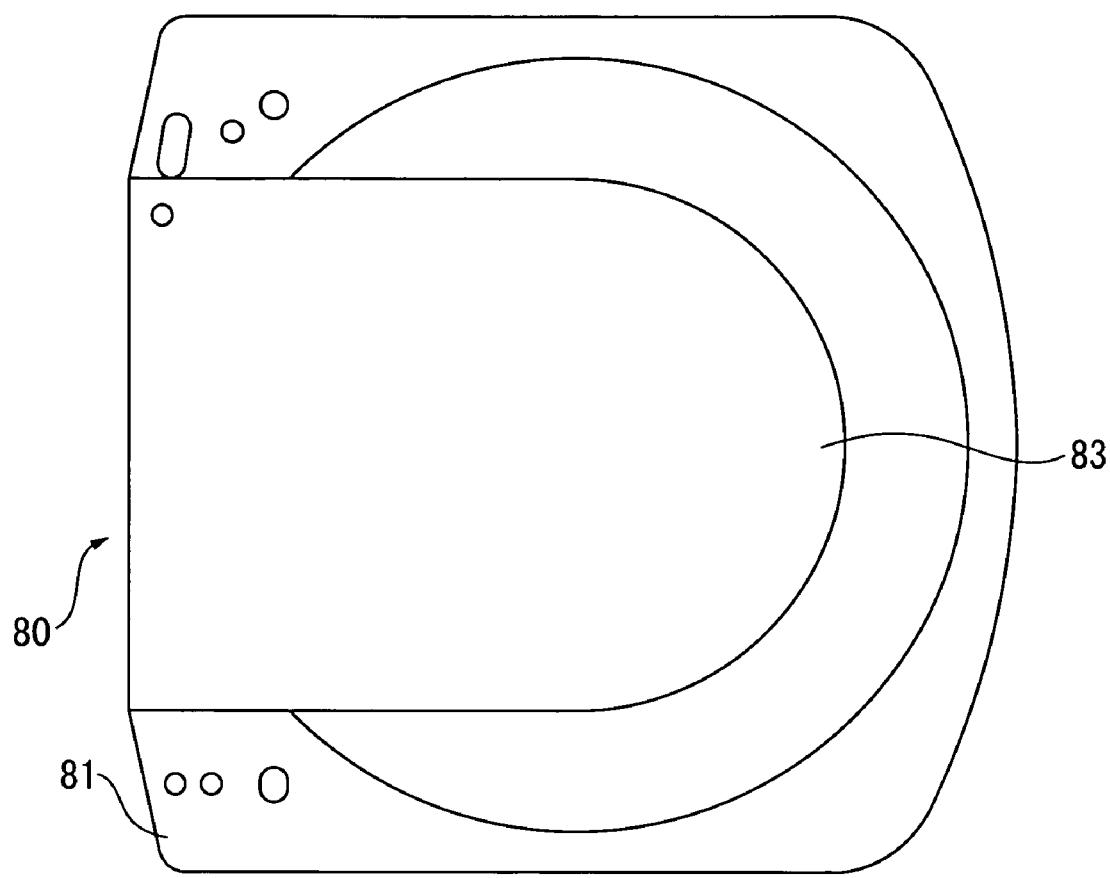
FIG. 1A is a front view of a shield type cartridge.

40 . . . clamp mechanism as recording medium holder
60 . . . stopper
61 . . . stopper body
62 . . . recording medium detector
63 . . . rotary shaft
100 . . . recording medium drive device
141 . . . front opening as recording medium loading slot
611 . . . insertion preventer
621 . . . roller

BEST MODE FOR CARRYING OUT THE INVENTION

An embodiment of the present invention will be described below with reference to the attached drawings. FIG. 1 and FIG. 2 show examples of recording medium used in a recording medium drive device of the embodiment. FIG. 3 to FIG. 6 show the recording medium drive device of the embodiment.

Figure 1B:
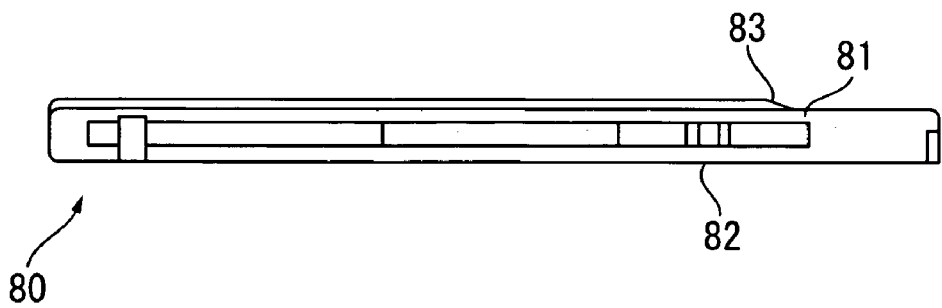
FIG. 1B is a side view of the shield type cartridge.
Figure 2A:
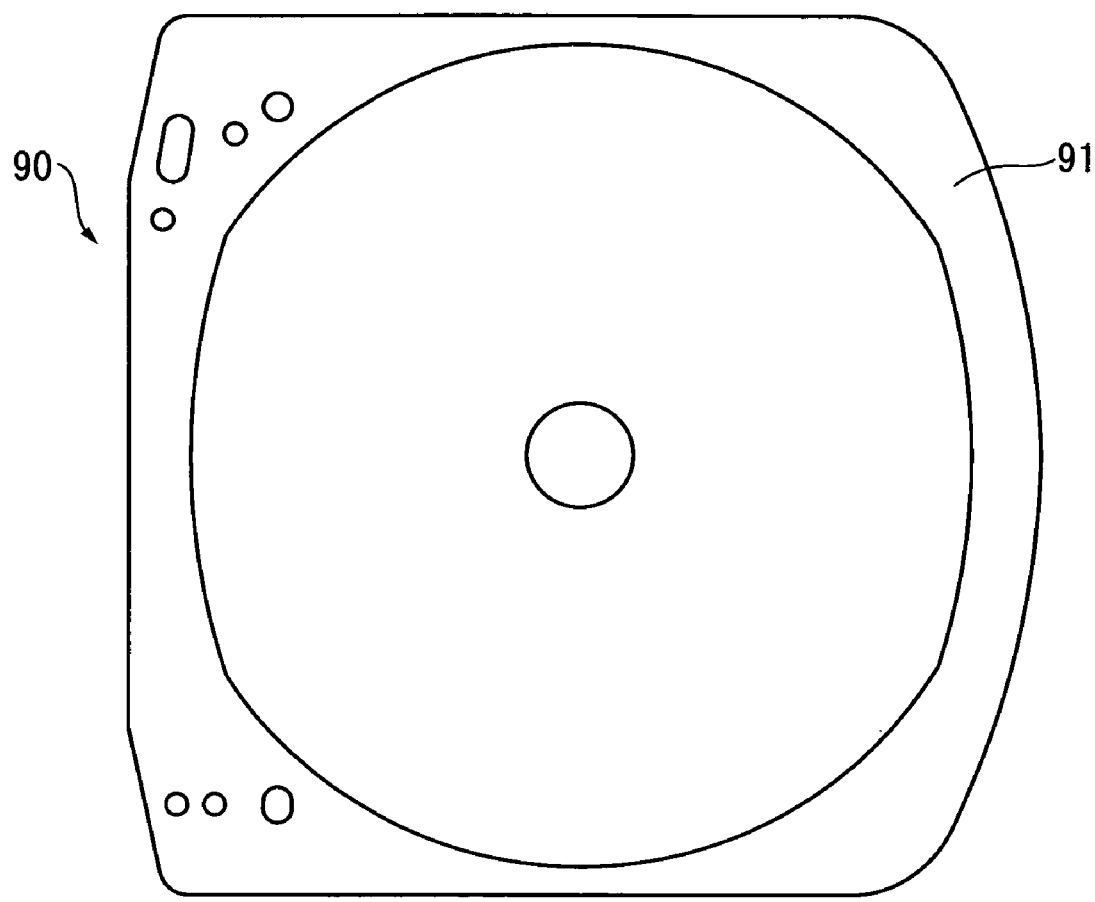
FIG. 2A is a front view of an open type cartridge.

The recording media used in the recording medium drive device of the embodiment will be described below with reference to FIG. 1 and FIG. 2. FIG. 1A is a front view of a shield type cartridge, and FIG. 1B is a side view of the shield type cartridge. FIG. 2A is a front view of an open type cartridge, and FIG. 2B is a side view of the open type cartridge.

As shown in FIGS. 1A and 1B, the shield type cartridge 80 includes an upper cartridge case 81 and a lower cartridge case 82, each being formed in flat plate shape, and an optical disc (not shown) as a recording medium body rotatably housed between the upper cartridge case 81 and the lower cartridge case 82. Provided above the optical disc are a chucking plate (not shown) and a plate holder (not shown). Further, a projected part 83 is provided on the upper cartridge case 81, the projected part 83 being projected from the upper cartridge case 81 by an amount equal to the thickness of the chucking plate and the plate holder.

Figure 2B:
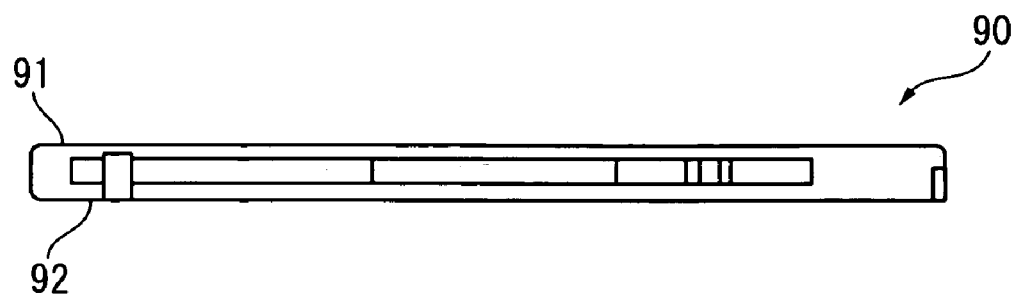
FIG. 2B is a side view of the open type cartridge.

As shown in FIGS. 2A and 2B, the open type cartridge 90 includes an upper cartridge case 91, a lower cartridge case 92, and an optical disc (not shown) rotatably housed between the upper cartridge case 91 and the lower cartridge case 92. Since no chucking plate and plate holder are provided in the cartridge cases 91 and 92, the thickness of the open type cartridge 90 is smaller than that of the shield type cartridge 80, and the upper cartridge case 91 has a flat shape.

Figure 3:
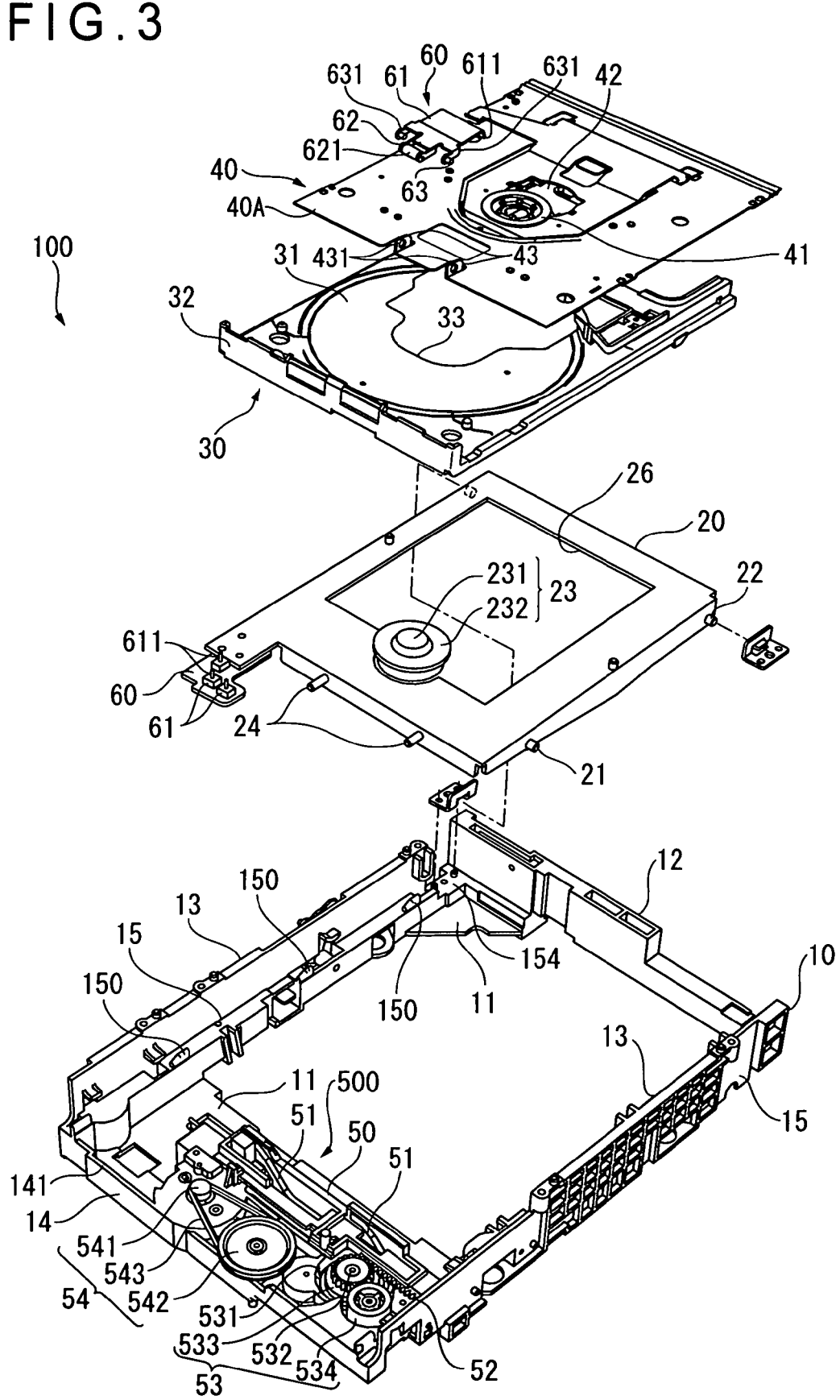
FIG. 3 is an exploded perspective view showing a recording medium drive device according to an embodiment of the present invention.

FIG. 3 is an exploded perspective view showing the recording medium drive device of the embodiment. The reference numeral 100 in FIG. 3 is assigned to the recording medium drive device. The recording medium drive device 100 houses the recording medium therein, and reproduces information from the recording medium and/or records information onto the recording medium. The recording medium housed in the recording medium drive device 100 may be a bare disc type recording medium in which an optical disc such as a CD (Compact Disc), DVD (Digital Versatile Disc), etc. is used in a bare manner, or may be a recording medium of an open type cartridge as shown in FIG. 2. The recording medium drive device 100 may be housed in a predetermined position of terminal equipment such as a personal computer, or audio equipment. Accordingly, dimensions of the recording medium drive device is determined according to dimensions the predetermined housing position. Incidentally, though the present invention is described by exemplifying a recording medium drive device built in the terminal equipment or the audio equipment, the present invention is not limited thereto. In other words, the present invention may also be applied to an external drive provided outside the terminal equipment or the audio equipment, or to a device capable of being used singularly such as a portable CD player.

The recording medium drive device 100 includes a frame 10 being substantially rectangular in plan view, a base 20 attached in the frame 10, a tray 30 adapted to be ejected from/retracted into the frame 10, a clamp mechanism 40 as a recording medium holder covering the upper face of the frame 10, and a metal casing (not shown) covering the outer periphery of the frame.

(Arrangement of Frame)

The frame 10 is made of synthetic resin or the like. The frame 10 is substantially formed in a box shape, in which a bottom portion 11 is rectangular in plan view. The frame 10 includes a rear portion 12 integrally formed with the bottom portion 11 on one short-side periphery of the bottom portion 11, a front portion 14 integrally formed with the bottom portion 11 on the other short-side periphery so as to rise from the bottom portion 11, and two lateral portions 15 integrally formed with the bottom portion 11 on long-side peripheries. The lateral portions 15 and the rear portion 12 forms an upper open portion 13 facing the bottom portion 11.

Regardless of whether the recording medium drive device 100 is set horizontally or vertically, the recording medium drive device 100 will be described based on the definition in which the upper opening 13 side is the upper side; the bottom portion 11 side is the lower side; the rear portion 12 side is the rear side; and the front portion 14 side is the front side. Further, directions from the front side toward the rear side and vice versa are defined as an advance/retreat direction; directions from the upper side and the bottom side and vice versa are defined as an up-down direction; and directions from/toward a side face orthogonal to the advance/retreat direction and the up-down direction is defined as a lateral direction.

The lateral portions 15, the front portion 14 and the rear portion 12 are provided on the peripheries of the bottom portion 11, forming an enclosed open space. The open space is for accommodating an electrical circuit (a circuit board). The circuit board is disposed closely to the whole bottom portion 11 including the enclosed open space. Operation of the recording medium drive device 100 is controlled by the electrical circuit.

The rear portion 12 has an external terminal (not shown) on the bottom side. The external terminal is electrically connected with the electric circuit on the bottom portion 11 in the frame. The external terminal has, for example, a power source cable connector for supplying electricity to the recording medium drive device and an external terminal connector for connecting the recording medium drive device with external equipment such as a personal computer. Information reproduced and/or recorded by the recording medium drive device 100 is mainly input/output through the external terminal.

Sliding pieces 150 for slidably supporting the tray 30 are provided to inner walls of the lateral portions 15 along the advance/retreat direction. The base 20 is pivotally attached on the rear side of the lateral portions 15.

The front portion 14 has a smaller length in the up-down direction as compared to the rear portion 12 and the lateral portions 15. A front opening 141 as a recording medium loading slot is formed on the upper side of the front portion 14, through which the tray 30 is ejected and retracted. An operating unit (not shown) connected to the electrical circuit on the bottom portion 11 is provided on the front portion 14. The operating unit includes, for example, an eject button for ejecting and retracting the tray 30, a volume control for controlling sound volume, and an insertion port for an earphone.

(Arrangement of Base)

The base 20 is made by press-molding a metal plate. The base 20 is pivotally attached on the rear side of the lateral portion 15 of the frame 10, so that the base 20 can be advanced/retreated in the up-down direction. A disc table 23 is attached to the base 20 at a position away from the front side by a predetermined distance and substantially in the middle in the lateral direction. The disc table 23 is round in plan view and rotatable around a rotation axis in the up-down direction. Being interlocked with the pivot of the base 20, the disc table 23 can be advanced/retreated in the up-down direction. The disc table 23 projects from an upper surface of the base 20 toward the upper side. A rotary drive mechanism (not shown) such as a motor is provided on the lower side of the disc table 23, the rotary drive mechanism being electrically connected with the electrical circuit via, e.g., a synthetic resin flexible substrate with a pattern wiring embedded therein. When an electric signal of a drive command is transmitted from the electric circuit, the rotary drive mechanism rotates the disc table 23 at high speed.

The disc table 23 includes a mounting portion 232 for mounting the recording medium and a tapered portion 231 provided at the center of the mounting portion 232, the tapered portion 231 having a smaller diameter on the upper side. The tapered portion 231 is fitted with a circular hole of the optical disc. A magnet (not shown) is embedded in the tapered portion 231 on the upper side. A sheet (not shown) made of synthetic resin is adhered on the mounting portion 232 on the upper side, the sheet serving as a surface protector of the recording medium as well as a slip stopper. Owing to the sheet, the recording medium is prevented from slipping even when the disc table 23 is rotated at high speed.

A recording/reproducing mechanism setting hole 26 is formed in the base 20 on the rear side of the disc table 23. A recording/reproducing mechanism (not shown) is provided in the recording/reproducing mechanism setting hole 26. The recording/reproducing mechanism records and/or reproduces information by irradiating a laser beam to a recording surface of the recording medium and is advanceable and retreatable in the advance/retreat direction of the recording/reproducing mechanism setting hole 26 of the base 20. A flexible cable (not shown) made of synthetic resin is connected to a part of the recording/reproducing mechanism, and the recording/reproducing mechanism is electrically connected with the electrical circuit via the flexible cable.

(Arrangement of Tray)

The tray 30 is made of, for example, synthetic resin such as ABS resin. The tray 30 is for mounting the recording medium such as a CD and a DVD so as for the recording medium to be housed inside the recording medium drive device. The tray 30 includes a mounting surface 31 formed in a rectangular shape in plan view and a rising portion 32 rising from a periphery of the mounting surface 31 on the front side. Linear grooves (not shown) are integrally formed in lateral surfaces of the tray 30 on the lower side along a direction in which the tray 30 ejects and retracts. The sliding pieces 150 of the lateral portions 15 engage with the grooves. The grooves and the sliding pieces 150 enable the tray 30 to smoothly eject and retract in the advance/retreat direction.

The mounting surface 31 is for mounting an optical recording medium such as a CD and a DVD. A hole 33 is provided substantially at the center of the mounting surface 31. When the tray 30 is housed in the frame 10, the disc table 23 is projected from the hole 33 toward the mounting surface 31 side to hold the recording medium. Further, through the hole 33, a pickup (not shown) can advance and retreat relative to the recording surface of the recording medium, which enables reproducing and/or recording of the recording medium.

The rising portion 32 functions as a cover to cover the front side of the tray 30 and hide the front opening 141. Further, in the case where the recording medium is not held by the disc table 23, the rising portion 32 prevents the recording medium from being dropped to the front side from the mount surface 31.

(Arrangement of Clamp Mechanism)

The clamp mechanism 40 is attached to the upper opening 13 of the frame 10. The clamp mechanism 40 is for holding the recording medium engaged with the disc table 23, so that the recording medium does not drop off the disc table 23. The clamp mechanism 40 includes a metal top plate 40A fixed to the upper opening 13 by screw or the like, a clamper holder 42 provided substantially at the center of the top plate 40A, and a clamper 41 held by the clamper holder 42 at the position facing the disc table 23. The clamper 41 is made of synthetic resin and has a disk-shaped metal member (not shown) embedded in a central portion thereof on the upper side. The clamper holder 42 is provided with a plate spring (not shown) that biases the clamper holder 42 toward the upper side when the clamper holder 42 is moved toward the lower side.

The present embodiment will be described by exemplifying a case where a disk-shaped optical disc as a recording medium is mounted on the mounting surface 31 of the tray 30, and the tray 30 is housed inside the frame 10 of the recording medium drive device 100 having the clamp mechanism 40. In this case, the circular hole of the optical disc is engaged with the tapered portion 231 of the disc table 23, and the optical disc is mounted on the sheet member (not shown) of the mounting portion 232. The optical disc can be held by the magnet (not shown) embedded in the tapered portion 231 of the disc table 23 and the clamper 41, thereby the optical disc is fixed so as not to drop off the disc table 23. At this time, the clamper 41 contacts the disc table 23 side due to the magnet of the disc table 23 and the clamper holder 42 also moves toward the lower side. Thus even when the optical disc is rotating at high speed while performing reproducing and/or recording, the optical disc will not drop off the disc table.

When the optical disc is ejected, the disc table 23 is moved toward the lower side, so that the magnet and the clamper 41 are separated away from each other, and the clamper 41 is pressed by the plate spring (not shown) to move toward the upper side together with the clamper holder 42. When the disc table 23 is moved to the lower side of the mounting surface 31, the disc is mounted on the upper side of the mounting surface 31, so that the recording medium can be removed by ejecting the tray 30 from the frame 10.

(Arrangement of Stopper)

Figure 4:
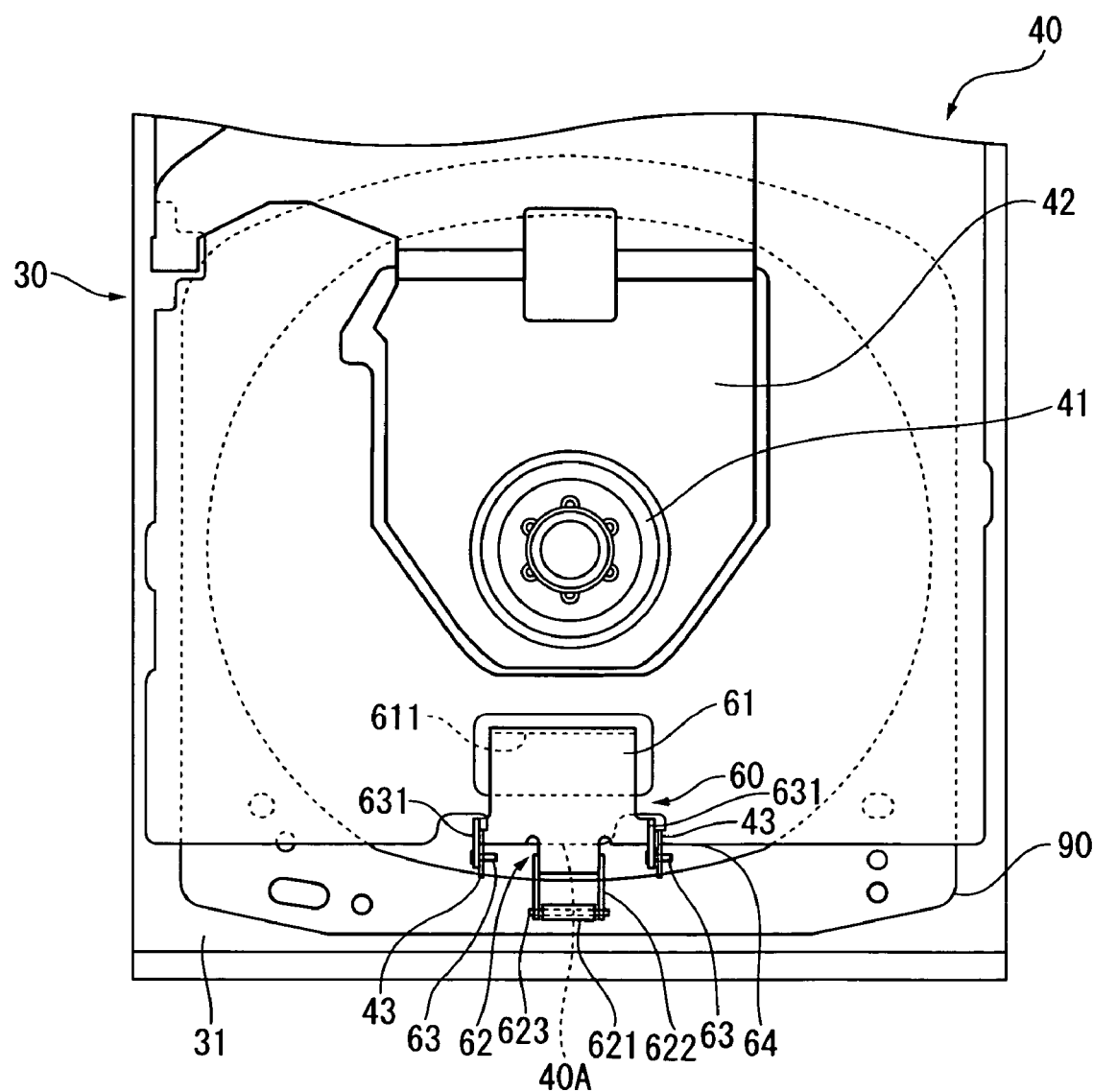
FIG. 4 is a front view showing the recording medium drive device seen from the upper side.

FIG. 4 is a front view showing the recording medium drive device 100 seen from the upper side. As shown in FIGS. 3 and 4, a stopper 60 is provided on the front side of the top plate 40A substantially in the vicinity of the center of the front opening 141 of the front portion 14. The stopper 60 detects the shape of the cartridge of the recording medium to be inserted into the recording medium drive device 100 to allow the open type cartridge 90 to be inserted but prevent the shield type cartridge 80 from being inserted.

The stopper 60 includes a stopper body 61, a recording medium detector 62, rotary shafts 63, and a torsion bar (not shown) as a biasing section.

The stopper body 61 is formed by press-molding a metal plated into a substantially flat plate. On the front side of the stopper body 61, shaft supporting arms 631 rising from the surface of the stopper body 61 are formed by bending the stopper body 61. The shaft supporting arms 631 are each provided with a rotary shaft 63. Further, rising portions 43 rising from a surface of the top plate 40A are formed substantially at the center of the front side of the top plate 40A of the clamp mechanism 40, the rising portions 43 being each provided with a shaft hole 431. The stopper 60 is supported by inserting the rotary shafts 63 through the shaft holes 431 of the top plate 40A.

The end of the rear side of the stopper body 61 is provided with an insertion preventer 611 formed by bending the stopper body 61 toward the lower side. The insertion preventer 611 abuts on the shield type cartridge 80 to prevent the shield type cartridge 80 from being inserted.

The rotating range of the stopper body 61 around the rotary shafts 63 as a rotating center is a gap defined by an upper surface of the recording medium drive device 100 and an entering passage of the recording medium, the size of the gap being set very small. For this reason, it is preferred that a thin metal plate is used for the stopper body 61. Further, to increase the strength of the stopper body 61, it is preferred that the area of the flat surface of the stopper body 61 is set large.

The recording medium detector 62 is formed on the stopper body 61. The recording medium detector 62 is projected from the rotary shafts 63 toward the front side. The recording medium detector 62 and the stopper body 61 interlock with each other to rotate around the rotary shafts 63 as a rotating center. In other words, when the recording medium detector 62 rotates around the rotary shafts 63 as a rotating center toward the lower side, the stopper body 61 rotates around the rotary shafts 63 as a rotating center toward the upper side; when the recording medium detector 62 rotates around the rotary shafts 63 as a rotating center toward the upper side, the stopper body 61 rotates around the rotary shafts 63 as a rotating center toward the lower side.

The tip end of the recording medium detector 62 is provided with roller mounting arms 622. The roller mounting arms 622 are formed by bending the front side of the stopper body 61. The roller mounting arms 622 project from the rotary shaft 63 toward the front side. A cylindrical roller 621 is rotatably supported at the tip ends of the roller mounting arms 622. The roller 621 can rotate around the roller shaft 623 as a rotating center. Note that the roller 621 does not necessarily have the shape described above. For example, the roller 621 can be rotatably supported by two confronted projections provided at the tip end of the recording medium detector 62, so that the roller shafts 623 become unnecessary. The roller 621 also can be supported by roller shafts directly formed at the tip end of the recording medium detector 62, so that the roller mounting arms 622 become unnecessary. Further, the quantity of the roller 621 is not necessarily specified. For example, a plurality of rollers can be provided at the tip end of the roller mounting arm 622.

The torsion bar is provided at one end of the rotary shaft 63 to bias the recording medium detector 62 toward the lower side (namely toward the direction in which the recording medium detector 62 abuts on the recording medium). Incidentally, though the torsion bar is provided at one end of the rotary shaft 63 in the present embodiment, the present invention is not intended to be limited thereto. For example, the torsion bar may be provided at both ends of the rotary shaft 63. Further, other biasing sections such a plate spring or a coil spring may be used instead of the torsion bar. In such a case, however, the biasing section needs to be appropriately selected so that the thickness of the stopper 60 and the thickness of the device as a whole do not increase. Thus, the torsion bar which has small thickness is preferred to be used as the biasing section in the present embodiment.

(Operation of stopper)

Figure 5A:
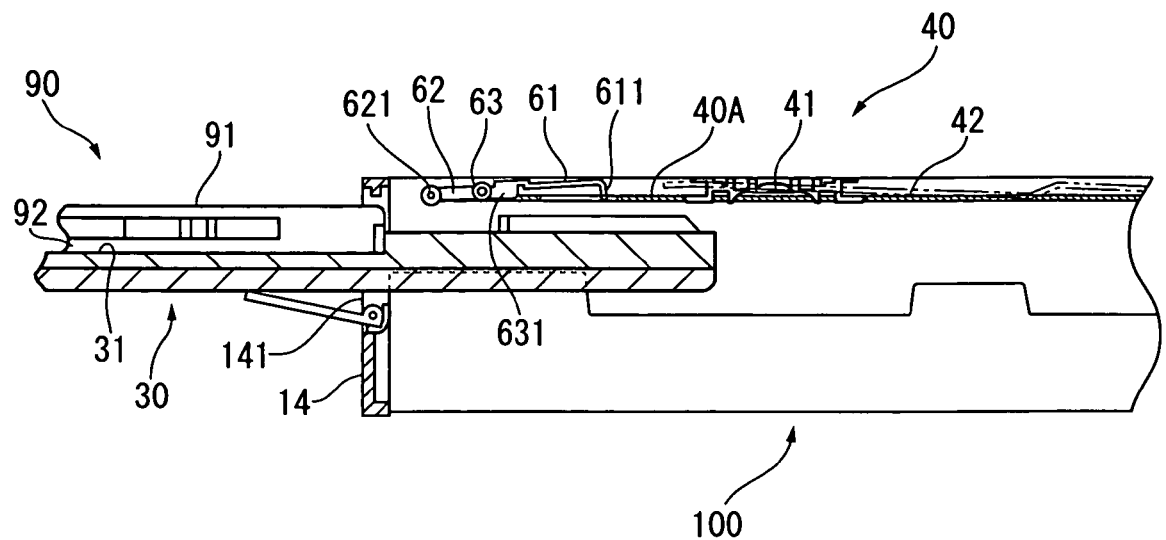
FIG. 5A is a vertical cross section in which the open type cartridge is mounted on a tray of the recording medium drive device.
Figure 5B:
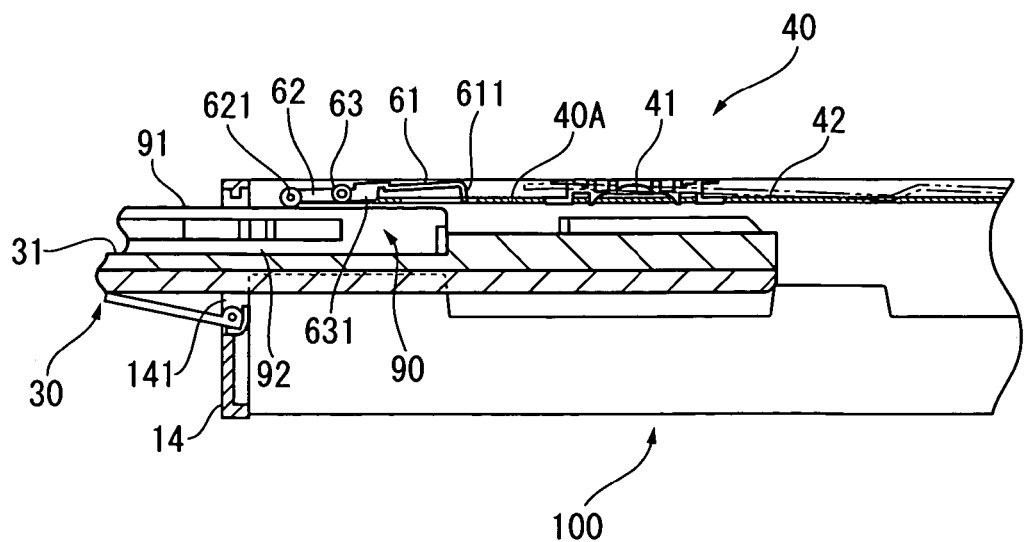
FIG. 5B is a vertical cross section in which the open type cartridge is passing through a stopper.
Figure 5C:
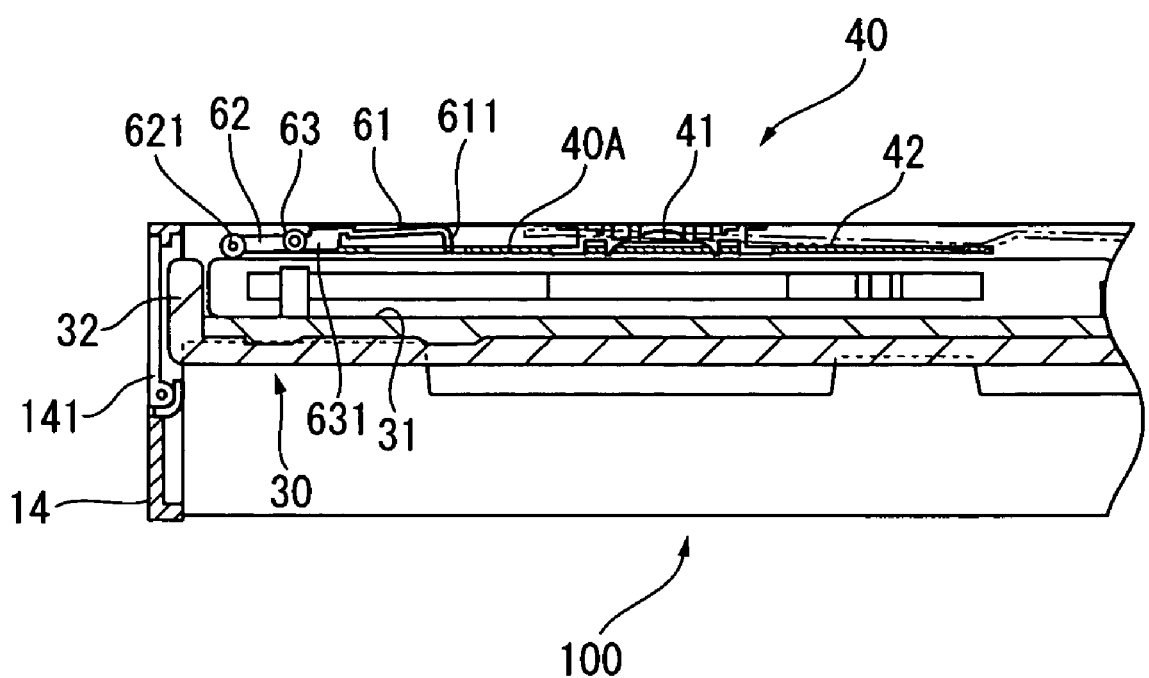
FIG. 5C is a vertical cross section in which the open type cartridge is housed in the recording medium drive device.
Figure 6A:
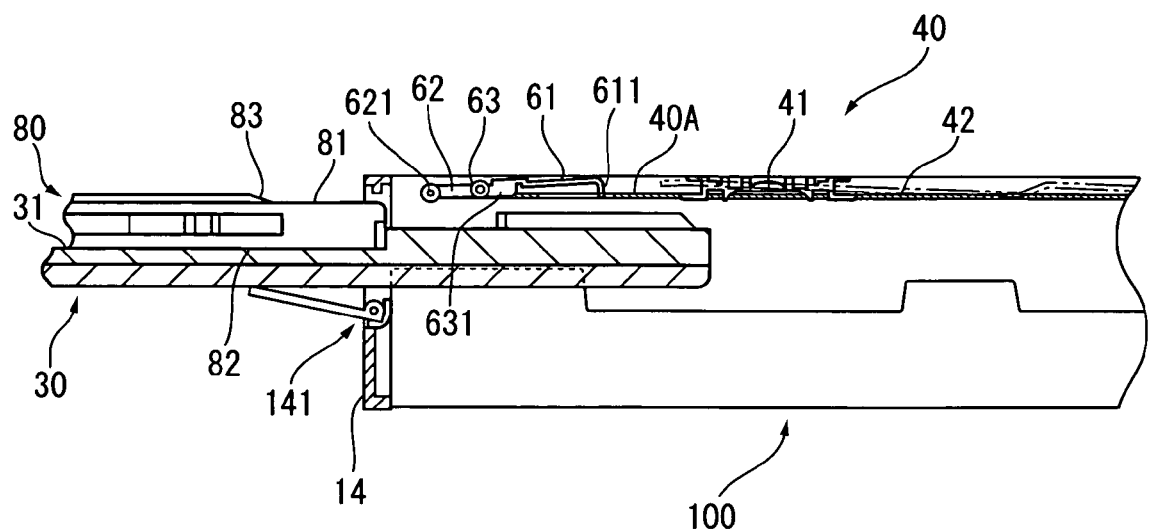
FIG. 6A is a vertical cross section in which the shield type cartridge is mounted on the tray of the recording medium drive device.
Figure 6B:
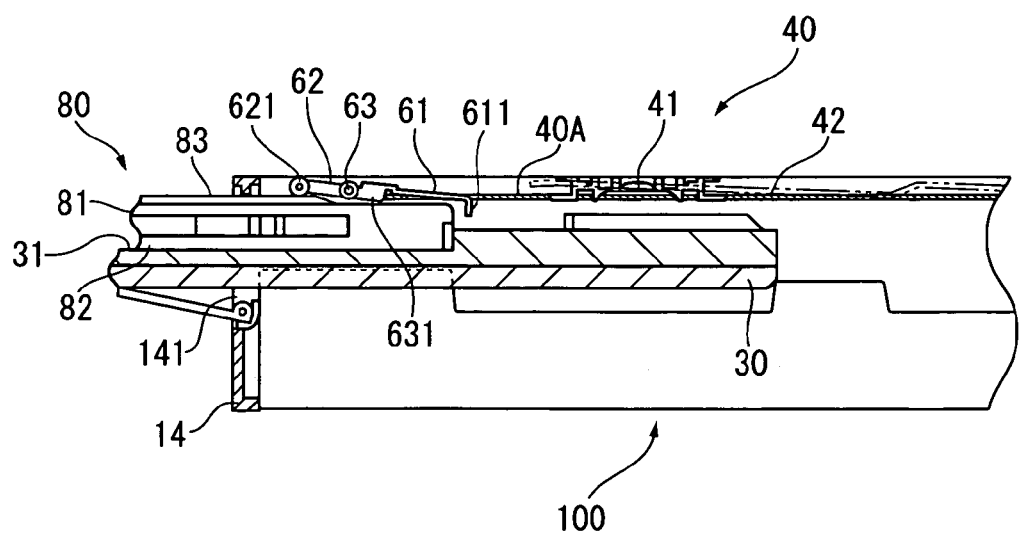
FIG. 6B is a vertical cross section in which the insertion of the shield type cartridge is prevented by the stopper.

FIG. 5A is a vertical cross section in which the recording medium of the open type cartridge 90 as shown in FIG. 2 is mounted on the tray 30 of the recording medium drive device 100. FIG. 5B is a vertical cross section in which the open type cartridge 90 is passing through the stopper 60. FIG. 5C is a vertical cross section in which the open type cartridge 90 is housed in the recording medium drive device 100. FIG. 6A is a vertical cross section in which the recording medium of the shield type cartridge 80 as shown in FIG. 1 is mounted on the tray 30 of the recording medium drive device 100. FIG. 6B is a vertical cross section in which insertion of the shield type cartridge 80 is prevented by the stopper 60.

The case where the open type cartridge 90 is mounted on the tray 30, as shown in FIG. 5A, to be housed in the recording medium drive device 100 will be described below. The upper cartridge case 91 of the open type cartridge 90 has a flat shape. Accordingly, when inserting the tray 30 into the recording medium drive device 100, the roller 621 abuts on the surface of the flat upper cartridge case 91 of the open type cartridge 90 so as to rotate, and the recording medium detector 62 will not be raised by the open type cartridge 90 (refer to FIG. 5B). Incidentally, in this case, the roller 621 may also remain in a predetermined position instead of abutting on the flat upper cartridge case 91 of the open type cartridge 90. Since the stopper body 61 does not rotate toward the lower side, the open type cartridge 90 will be housed into the recording medium drive device 100 without abutting on the insertion preventer 611 of the stopper body 61 as shown in FIG. 5C.

Next, the case where the shield type cartridge 80 is mounted on the tray 30, as shown in FIG. 6A, and is tried to be housed in the recording medium drive device 100 will be described below. The shield type cartridge 80 has a projected part 83 formed on the upper cartridge case 81, the projected part 83 projecting toward the upper side. Accordingly, when the tray 30 is tried to be inserted into the recording medium drive device 100, the roller 621 of the recording medium detector 62 will be abutted by the projected part 83 of the shield type cartridge 80 and raised as shown in FIG. 6B. Being interlocked with the recording medium detector 62, the stopper body 61 will rotate toward the lower side. If the shield type cartridge 80 is tried to be further inserted in this state, the tip end of the shield type cartridge 80 will abut on the insertion preventer 611 of the stopper body 61, so that the shield type cartridge 80 is prevented from being further inserted.

Incidentally, another arrangement may be adopted in which the information (namely the difference in shape) detected by the recording medium detector 62 is transformed into an electrical signal, and a driving force is reversed to the ejecting direction of the recording medium based on the electrical signal, so that the insertion of the recording medium is prevented. Specifically, when a shield type cartridge is tried to be inserted for example, a detection signal is generated based on the information detected by the recording medium detector 62, and the detection signal is input to a power mechanism for moving the tray 30 into/out of the recording medium drive device 100. Based on the detection signal, the power mechanism reverses the driving force to the ejecting direction of the tray 30. With such an arrangement, the insertion of the shield type cartridge can be prevented. In such a case, the stopper 60 is not necessary since the function can be achieved by the recording medium detector 62 and the power mechanism. It is evident that the insertion of the shield type cartridge can be prevented more effectively if the above arrangement and the stopper 60 are used in combination.

(Connection Between Base and Tray)

Referring back to FIG. 3, an interlocking mechanism 500 is provided on the front side of the rear portion 12. The interlocking mechanism 500 includes a drive cam 50 engaged with the base 20; a first rack 52 integrally formed with the drive cam 50; a gear mechanism 53 engaged with the first rack 52, the gear mechanism 53 including a first gear 531, a second gear 532, a third gear 533, and a fourth gear 534; a motor 54 engaged with the gear mechanism 53 and driven under control of the electrical circuit, and a second rack (not shown) provided on the lower side of the tray 30 and engaged with the gear mechanism 53.

The drive cam 50 is made of synthetic resin or the like. The drive cam 50 is arranged so as to be reciprocated in the lateral direction orthogonal to the advance/retreat direction of the tray 30. A cam groove 51 extending in the lateral direction is provided on the rear side of the drive cam 50. The cam engaging pin 24 of the base 20 is engaged with the cam groove 51. The cam groove 51 is inclinedly formed with one end positioned on the upper side and the other end on the lower side. Since the drive cam 50 is reciprocated in the lateral direction, the cam engaging pin 24, climbing along the inclined portion, is moved between the two ends of the cam groove 51, and thereby the base 20 can be reciprocated in the up-down direction.

The first rack 52 formed on a lateral side of the drive cam 50 is engaged with the third gear 533 of the gear mechanism 53. The second gear 532 having a larger diameter than that of the third gear 533 is integrally formed with the third gear 533 on the lower side of the third gear 533, and the second gear 532 is engaged with the first gear 531 and the fourth gear 534.

The first gear 531 is engaged with the motor gear 542 of the motor 54. The motor gear 542 is connected with the wheel 541 through a ring-shaped belt 543 made of synthetic resin. A motor body (not shown) is provided on the lower side of the wheel 541 via the frame 10, and the drive force is directly supplied by the motor body. The motor body is electrically connected with the electrical circuit, and the rotation of the motor body is controlled by the electrical circuit.

The fourth gear 534 is engaged with the second rack (not shown) provided on the lower side of the tray 30.

When an advance/retreat command is transmitted to the electrical circuit by an input from an eject button or from outside, the electrical circuit makes the motor body rotate. When the motor body rotates, the rotation is transmitted to the first gear 531 of the gear mechanism 53 via the wheel 541 and the motor gear 542. The rotation power is transmitted to the second gear 532 from the first gear 531, so that the third gear 533 integrally formed with the second gear and the fourth gear 534 engaged with the second gear 532 rotate. When the third gear 533 rotates, the drive cam 50 engaged with the third gear 533 via the first rack 52 moves in the lateral direction, and the base 20 engaged with the drive cam 50 moves toward the upper side, or toward the lower side. Further, when the fourth gear 534 rotates, the tray 30 engaged with the fourth gear 534 via the second rack moves toward the rear side, or toward the front side.

In such a manner, the base 20 and the tray 30 connect with each other via the drive cam 50 and the gear mechanism 53. Further, when ejecting the tray 30, the disc table 23 is moved to a standby position before the tray 30 is ejected.

[Advantages of Recording Medium Drive Device]

The above described recording medium drive device 100 has below advantages.

The recording medium drive device 100 of the present embodiment is provided with the stopper 60 which detects the projected part 83 formed on the upper cartridge case 81 of the shield type cartridge 80 so as to prevent the shield type cartridge 80 from being inserted. Accordingly, the difference in shape between the shield type cartridge 80 and the open type cartridge 90 can be detected, and the insertion of the shield type cartridge 80 can be prevented by the stopper 60. Accordingly, a failure of so called mechanical lock (in which the shield type cartridge is stuck inside the device due to erroneous insertion of the shield type cartridge 80) can be prevented.

In the recording medium drive device 100 of the present embodiment, the optical disc as a recording medium body is housed in the cartridge. Accordingly, since the difference in shape of the cartridge is easy to be detected, the difference in shape of the cartridge can be easily detected by the stopper 60 which has a simple structure.

When inserting the shield type cartridge 80 having the projected part 83 on the upper side thereof, the stopper 60 detects the projected part 83 and prevents the insertion of the shield type cartridge 80. The shield type cartridge 80 can be easily differentiated from the open type cartridge 90 by detecting the projected part 83 of the upper cartridge case 81, so that the mechanical lock caused by insertion of the shield type cartridge 80 can be prevented.

The stopper 60 is provided on the front side of the clamp mechanism 40 substantially in the vicinity of the center of the front opening 141. Thus, when inserting the cartridge, the shape of the cartridge can be detected immediately. Accordingly, when the cartridge to be inserted is the shield type cartridge, the insertion of the shield type cartridge can be prevented more quickly, and therefore the recording medium of the shield type cartridge will not be inserted into the back of the recording medium drive device 100, so that the mechanical lock can be prevented.

The stopper 60 has the stopper body 61 provided on one end of the rear side thereof for preventing the insertion of the shield type cartridge 80, the recording medium detector 62 provided on the other end of the front side, and the rotary shaft 63 for rotatably supporting the stopper 60 between the stopper body 61 and the recording medium detector 62. Thus when the recording medium detector 62 detects the projected part 83 of the shield type cartridge 80 and moves toward the upper side, the stopper body 61 moves toward the lower side so as to close the insertion passage of the cartridge. Accordingly, the insertion of the shield type cartridge 80 can be surely prevented with a simple structure.

Further, the roller 621 for rotatably abutting on the cartridge is provided at the tip end of the recording medium detector 62. Thus when the recording medium detector 62 abuts on the surface of the cartridge, since the roller 621 is rotated together with the movement of the cartridge, sliding resistance is reduced, so that the cartridge can be smoothly inserted, and further the cartridge can be prevented from being damaged. Accordingly, the shape of the cartridge can be detected by abutting on the cartridge without damaging the surface of the cartridge.

The recording medium detector 62 is biased toward a direction for abutting on the cartridge, namely toward the lower side. Accordingly, when inserting the cartridge, the shape of the cartridge can be detected immediately. When inserting the open type cartridge, the stopper body 61 can be regulated so that it does not move toward the lower side. Accordingly, when inserting the shield type cartridge, insertion of the shield type cartridge can be surely prevented by moving the stopper body 61 toward the lower side; when inserting the open type cartridge, the open type cartridge can be surely inserted into the device.

Herein the torsion bar is used as a biasing section. By using the torsion bar, the thickness of the biasing section is made small. Thus the thickness of the device as whole is made small.

It is enough to bias the recording medium detector 62 toward the lower side if the torsion bar is provided only at one end of either rotary shaft 63. Thus the number of components can be surely reduced. Accordingly, the manufacturing cost can be reduced.

The insertion preventer 611, which abuts the tip end of the shield type cartridge to prevent the shield type cartridge from being inserted into the device, is provided at the tip end of the stopper body 61. Thus, when inserting the shield type cartridge, the tip end of the shield type cartridge is abutted on the insertion preventer 611, so that the insertion of the shield type cartridge can be surely prevented. Accordingly, the insertion of the shield type cartridge can be surely prevented even when the shield type cartridge is tried to be inserted with a strong force, so that erroneous insertion of the shield type cartridge can be prevented.

The stopper 60 is provided on the upper side of the tray 30 and on the front side of the clamp mechanism 40. Since the stopper 60 is provided in vary narrow space between the upper surface of the recording medium drive device, to which the clamp mechanism 40 is provided, and the position in which the cartridge is inserted, not only the thickness of the device as a whole can be reduced, but also the projected part of the shield type cartridge can be detected so that the insertion of the shield type cartridge can be surely prevented.

The recording medium drive device 100 is provided with the tray 30, and the cartridge is mounted on the mounting surface 31 of the tray 30 so as to be inserted into the device. Thus, since the cartridge needs not to be forcedly inserted manually, even when the shield type cartridge is tried to be inserted, the insertion can be easily detected and prevented.

The stopper body 61 is formed by press-molding a thin metal plate so as to obtain a wide area in a plane direction. Thus not only the stopper body 61 can be made thin, but also the strength of the stopper body 61 can be increased.

The roller mounting arm 622 of the recording medium detector 62 is formed by bending the front side of the stopper body 61, and the shaft supporting arm 631 is also formed by bending the front side of the stopper body 61. Thus the stopper body 61, the roller mounting arm 622, and the shaft supporting arm 631 can be integrally formed by press-moulding. Accordingly, the number of the components can be reduced, production cost can be reduced, and assembling work can be facilitated.

Modifications of Embodiment

It is to be understood that the present invention is not limited to the embodiment described above, and various modifications and improvements can be made as long as the objects of the present invention can be achieved.

For example, although the roller mounting arm 622 of the recording medium detector 62 is formed by bending the front side of the stopper body 61 in the above embodiment, the present invention is not limited thereto. For example, the roller mounting arm can be fixed to the stopper body 61 via the rotary shaft 63 by means of welding, bonding, or the like.

In the present embodiment, though the stopper 60 detects the shield type cartridge 80 and prevents the insertion of the shield type cartridge 80 by rotating the stopper body 61 and the recording medium detector 62 around the rotary shafts 63 as a rotating center, the present invention is not limited thereto. For example, a groove can be formed on the cartridge of the recording medium allowed to be inserted, and a projection for engaging with the groove can be provided at a predetermined position of the recording medium drive device. With such an arrangement, the cartridge of the recording medium without the groove will be abutted by the projection provided at a predetermined position of the recording medium drive device, so that the cartridge can not be inserted into the device. On the other hand, when inserting the cartridge of the recording medium having the groove, the groove will engage with the projection provided inside the device, so that the cartridge can be inserted into the device. With such an arrangement, it is possible to only enable the predetermined cartridge to be inserted with simple structure.

Further, with such an arrangement, the projection provided inside the device can either be arranged on the front side of the clamp mechanism 40, or be arranged on the lower side of the position where the cartridge is housed (such as the mounting surface 31 of the tray 30). Accordingly, the position of the projection can be selected.

Though the present embodiment is described by exemplifying an arrangement where the recording medium is mounted on the mounting surface 31 of the tray 30, and the tray 30 is inserted into the tray type recording medium drive device 100, the present invention is not limited thereto. For example, the present invention can also be applied to a slot-in type recording medium drive device, in which the cartridge is inserted as it is through a recording medium loading slot. In the case of such a slot-in type recording medium drive device, since the cartridge is directly inserted into the device by a user, there is a possibility that the shield type cartridge might be inserted with a strong force. For this reason, in the case of such a slot-in type recording medium drive device, the stopper 60 can function more effectively and can surely prevent the recording medium of the shield type cartridge from being inserted.

Though the present embodiment is described by exemplifying an arrangement where the stopper 60 detects the difference in shape between the shield type cartridge 80 and the open type cartridge 90 and prevents the insertion of the shield type cartridge 80, the present invention is not limited thereto. For example, the arrangement also can be the one in which the insertion of the shield type cartridge 80 is allowed and the insertion of the open type cartridge 90 is prevented. Further, the arrangement also can be the one in which the insertion of the cartridge type recording medium is prevented and the insertion of a bare-disc type recording medium is allowed. In other words, the stopper can be any type as long as it detects the difference in shape of these recording media to prevent the insertion of a recording medium having a predetermined shape and allow the insertion of other recording medium.

Though the present embodiment is described by exemplifying an arrangement where the insertion preventer 611 formed by bending the tip end of the stopper body 61 is provided, the present invention is not limited thereto. For example, the arrangement also can be the one in which the tip end of the stopper body 61 is covered with a slip stopper made of a material having high frictional resistance value such as a rubber. With such an arrangement, when inserting the shield type cartridge, the stopper body 61 moves toward the lower side, and the slip stopper abuts on the shield type cartridge, so that the insertion of the shield type cartridge is prevented by the frictional force.

Further, though the present embodiment is described by exemplifying an arrangement where the torsion bar is provided at one end of the rotary shaft 63, the present invention is not limited thereto. In other words, the torsion bar may be provided at both ends of the rotary shaft 63 as described above. With such an arrangement, the recording medium detector 62 can be more surely biased toward the lower side by the torsion bars provided at both ends of the rotary shaft 63.

Though the torsion bar is used as the biasing section in the present embodiment, the present invention is not limited thereto. For example, the biasing section may be a plate spring or a coil spring for biasing the recording medium detector 62 toward the lower side. However, in the case where the coil spring is employed, there might be a possibility that the thickness of the stopper will be increased. In the case where the plate spring is employed, though it will be necessary to fix the plate spring by caulking, screwing or the like, the thickness of the stopper can be reduced, and the production cost can be reduced.

Though the present embodiment is described by exemplifying an arrangement where the roller 621 is provided at the tip end of the recording medium detector 62, the present invention is not limited thereto. For example, the arrangement can be the one in which the tip end of the recording medium detector 62 is bent into a curved shape, or the arrangement can be the one in which the tip end of the recording medium detector 62 is covered with a material having flexibility and low frictional resistance value such as cloth and the like. With such an arrangement, since the roller 621 is eliminated, the number of the components can be reduced, and therefore the production cost can be reduced.

In the present embodiment, though the stopper 60 is provided on the front side of the top plate 40A of the clamp mechanism 40 substantially in the vicinity of the center of the front opening 141, the present invention is not limited thereto. For example, the stopper 60 also can be provided at two ends of the front opening 141. In the present embodiment, when inserting the shield type cartridge 80 having arc-shaped tip end as shown in FIG. 1, since the position where the projected part 83 of the shield type cartridge 80 can be detected earliest is the position on the front side of the top plate 40A substantially in the vicinity of the center of the front opening 141, the stopper is arranged at this position. While in the case where the cartridge is rectangular in plan view and does not include a arc-shaped tip end, or in the case where the shape of the cartridge is different on the side thereof, the shape of the cartridge can be effectively detected by stoppers provided on two sides of the front opening 141. As described above, the stopper is preferred to be provided at the position in accordance with the shape of the recording medium to be detected.

Though the present embodiment is described by exemplifying an arrangement where the stopper 60 includes the stopper body 61, the recording medium detector 62, the rotary shafts 63 and the torsion bar; when inserting the shield type cartridge 80, the projected part 83 is detected, and the stopper body 61 rotates around the rotary shafts 63 as a rotating center toward the lower side so as to prevent the insertion of the shield type cartridge 80, the present invention is not limited thereto. For example, the arrangement also can be the one in which a stopper 60A as shown in FIG. 7 is employed. The stopper 60A includes a stopper body 61A having a substantially circular cross section, an abutting portion 62A projected from the front side of the stopper body 61A, and a rotary shaft extending in the lateral direction of the stopper body 61A. The stopper body 61A and the abutting portion 62A are made of a material having high coefficient of friction such as a rubber. The stopper body 61A and the abutting portion 62A have an arc-shaped lower surface. Further, the size between the end portion of the lower surface of the stopper body 61A and the abutting portion 62A and the mounting surface 31 of the tray 30 is larger than the thickness of the open type cartridge 90 but smaller than the thickness of the shield type cartridge 80 at the portion where the projected part 83 is provided. The abutting portion 62A is biased toward the upper side. The abutting portion 62A can be rotated around the rotary shafts 63A as a rotating center.

Figure 7A:
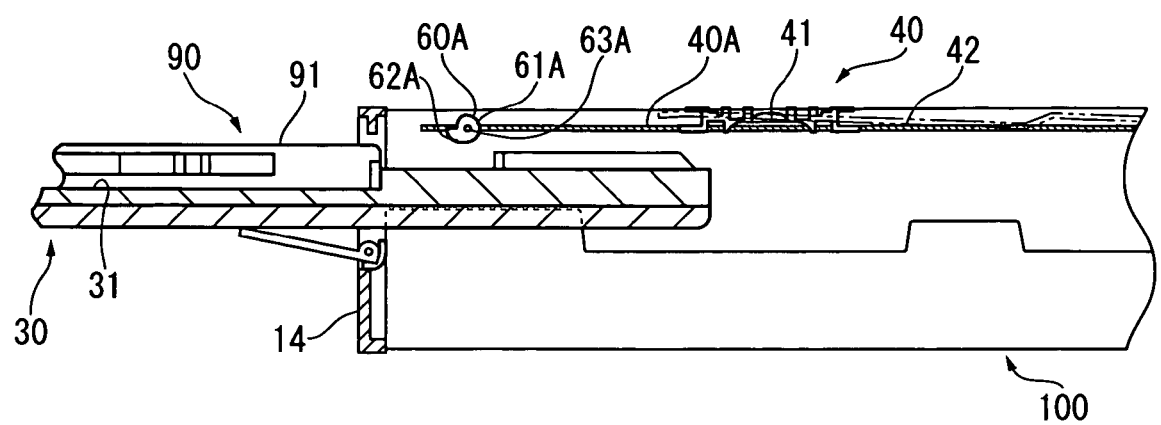
FIG. 7A is a vertical cross section in which the open type cartridge is mounted on ejected tray of a recording medium drive device employing a stopper described in a modification of the present invention.
Figure 7B:
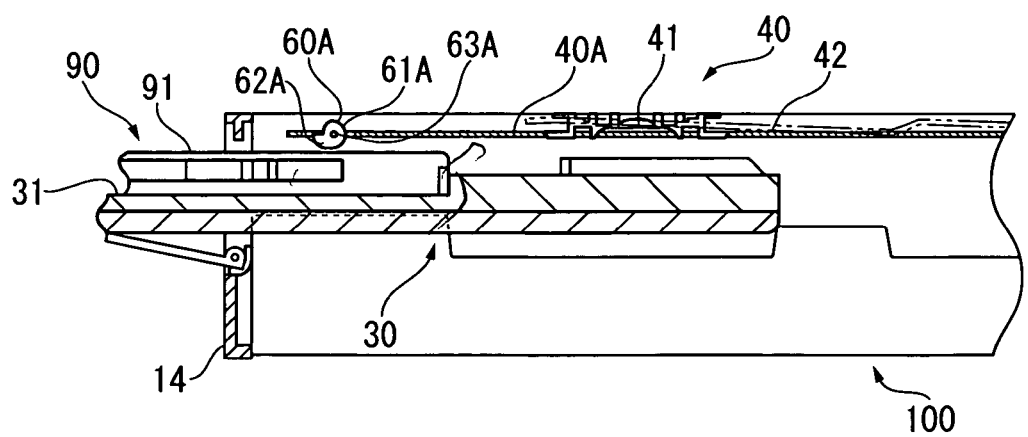
FIG. 7B is a vertical cross section in which the tray having the open type cartridge mounted thereon is tried to be housed in the recording medium drive device employing the stopper described in the modification of the present invention.
Figure 7C:
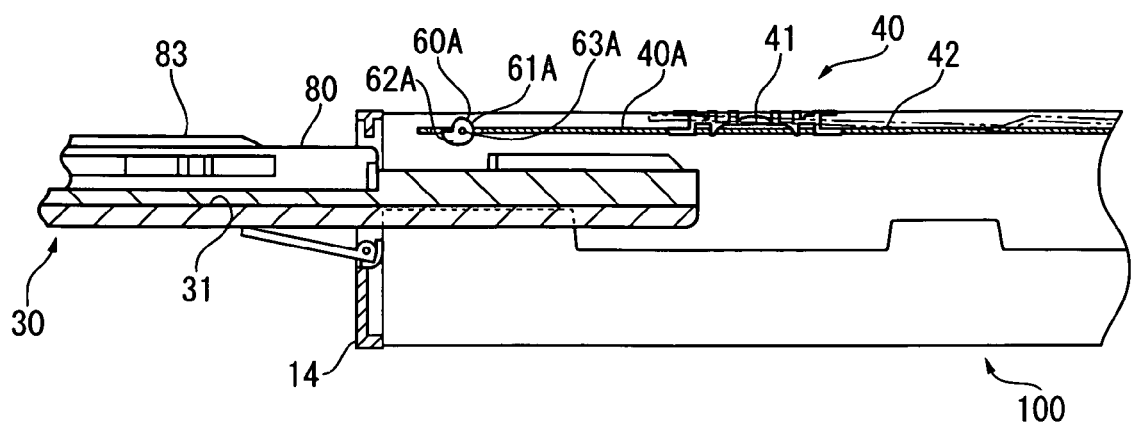
FIG. 7C is a vertical cross section in which the shield type cartridge is mounted on the ejected tray of the recording medium drive device employing the stopper described in the modification of the present invention.
Figure 7D:
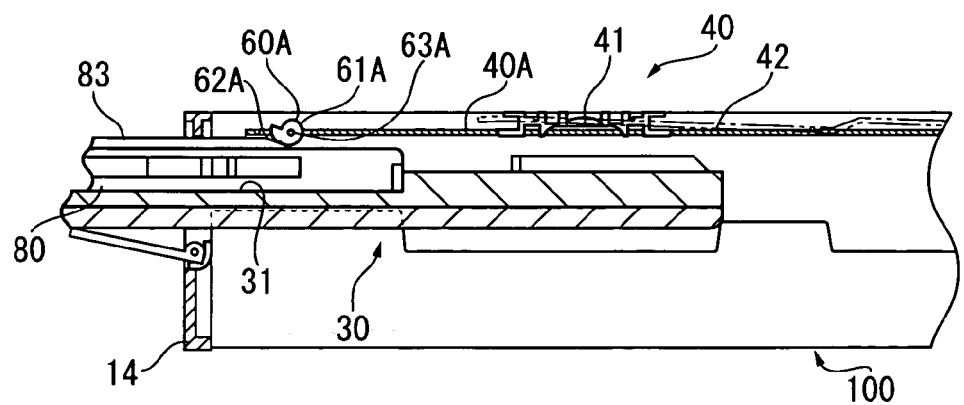
FIG. 7D is a vertical cross section in which the tray having the shield type cartridge mounted thereon is tried to be housed in the recording medium drive device employing the stopper described in the modification of the present invention.

With the recording medium drive device 100 having the aforesaid stopper 60A, when the open type cartridge 90 mounted on the tray 30 is tried to be inserted into the frame, as shown in FIGS. 7A and 7B, the upper cartridge case 91 of the open type cartridge 90 will not be abutted by the stopper 60A, and therefore the open type cartridge 90 can be inserted. On the other hand, when the shield type cartridge 80 mounted on the tray 30 is tried to be inserted into the frame, as shown in FIGS. 7C and 7D, the projected part 83 of the shield type cartridge 80 will be abutted by the abutting portion 62A. Since the stopper body 61A and the abutting portion 62A are made of the material having high coefficient of friction, when the shield type cartridge 80 is tried to be inserted further, the abutting portion 62A will be rotated toward the lower side together with the movement of the shield type cartridge 80, so that the abutting portion 62A presses the shield type cartridge 80 from the upper side to prevent the insertion of the shield type cartridge 80.

In the stopper 60A having the aforesaid arrangement, since the stopper body 61A and the abutting portion 62A are integrally formed with each other, and the stopper 60A is formed by inserting the rotary shaft into the stopper body 61A, the stopper 60A can be simply formed, and the production cost can be reduced. Further, when inserting the open type cartridge 90, since the stopper 60A does not abut on the upper cartridge case 91, the open type cartridge 90 can be prevented from being damaged; when inserting the shield type cartridge 80, since the stopper body 61A and the abutting portion 62A are made of relatively flexible material such as rubber, the shield type cartridge can be prevented from being damaged.

Effects of Embodiment

There is provided the which detects the projected part 83 formed on the upper cartridge case 81 of the shield type cartridge 80 so as to prevent the shield type cartridge 80 from being inserted. Thus the difference in shape between the shield type cartridge 80 and the open type cartridge 90 can be detected, and the insertion of the shield type cartridge 80 can be prevented by the stopper 60. Accordingly, the failure of so called mechanical lock (in which the shield type cartridge is stuck in the device due to erroneous insertion of the shield type cartridge 80) can be prevented.

INDUSTRIAL APPLICABILITY

The present invention can be applied to recording medium drive devices using a cartridge type recording medium.

The invention claimed is:
1. A recording medium drive device that allows, among a plurality of kinds of recording media having different shapes, only some of the recording media to be inserted therein, the recording medium drive device comprising:
- a stopper that detects a difference in shape between a first kind of the recording media and a second kind of the recording media so as to prevent the second kind of the recording media from being inserted, the stopper detecting a projection formed on an outer surface of a cartridge of the second kind of the recording media;
- wherein the recording medium drive device further comprises a recording medium loading slot through which to insert the recording media; and
- wherein the stopper is provided substantially in the vicinity of the center of the recording medium loading slot.

2. The recording medium drive device according to claim 1, wherein
   the stopper comprises a recording medium detector that detects the difference in shape between the first kind of the recording media and the second kind of the recording media, and a stopper body that interlocks with the recording medium detector to prevent the second kind of the recording media from being inserted.

3. The recording medium drive device according to claim 2, further comprising:
   a rotary shaft that rotatably supports the stopper between the stopper body and the recording medium detector, the stopper body being provided on one side of the rotary shaft, and the recording medium detector being provided on the other side of the rotary shaft.

4. The recording medium drive device according to claim 3, wherein
   the stopper body and the recording medium detector are integrally formed with each other.

5. The recording medium drive device according to claim 3, wherein
   the tip end of the stopper body is provided with an insertion preventer that abuts on the second kind of the recording medium to prevent the second kind of the recording medium from being inserted.

6. The recording medium drive device according to claim 2, wherein
   the tip end of the recording medium detector is provided with a roller that abuts on the recording medium so as to rotate.

7. The recording medium drive device according to claim 2, wherein
   the stopper comprises a biasing section that biases the recording medium detector toward a direction in which the recording medium detector abuts on the recording medium.

8. The recording medium drive device according to claim 7, wherein
   the biasing section is a torsion bar provided to the rotary shaft.

9. The recording medium drive device according to claim 8, wherein
   the rotary shaft is respectively provided at two sides of the stopper, and the torsion bar is provided at one end of either rotary shaft.

10. The recording medium drive device according to claim 1, further comprising:
    a tray that mounts the recording medium.

11. The recording medium drive device according to claim 1, wherein the difference in shape between the first kind of the recording media and the second kind of the recording media comprises the projection.

* * * * *